April 13, 1954

H. J. FINCH 2,674,760

TUBE CLEANING APPARATUS

Filed April 9, 1952

INVENTOR.
HARRY J. FINCH

BY

*S.R. Harris*

ATTORNEY

INVENTOR.
HARRY J. FINCH
BY
*G.R. Harris*
ATTORNEY

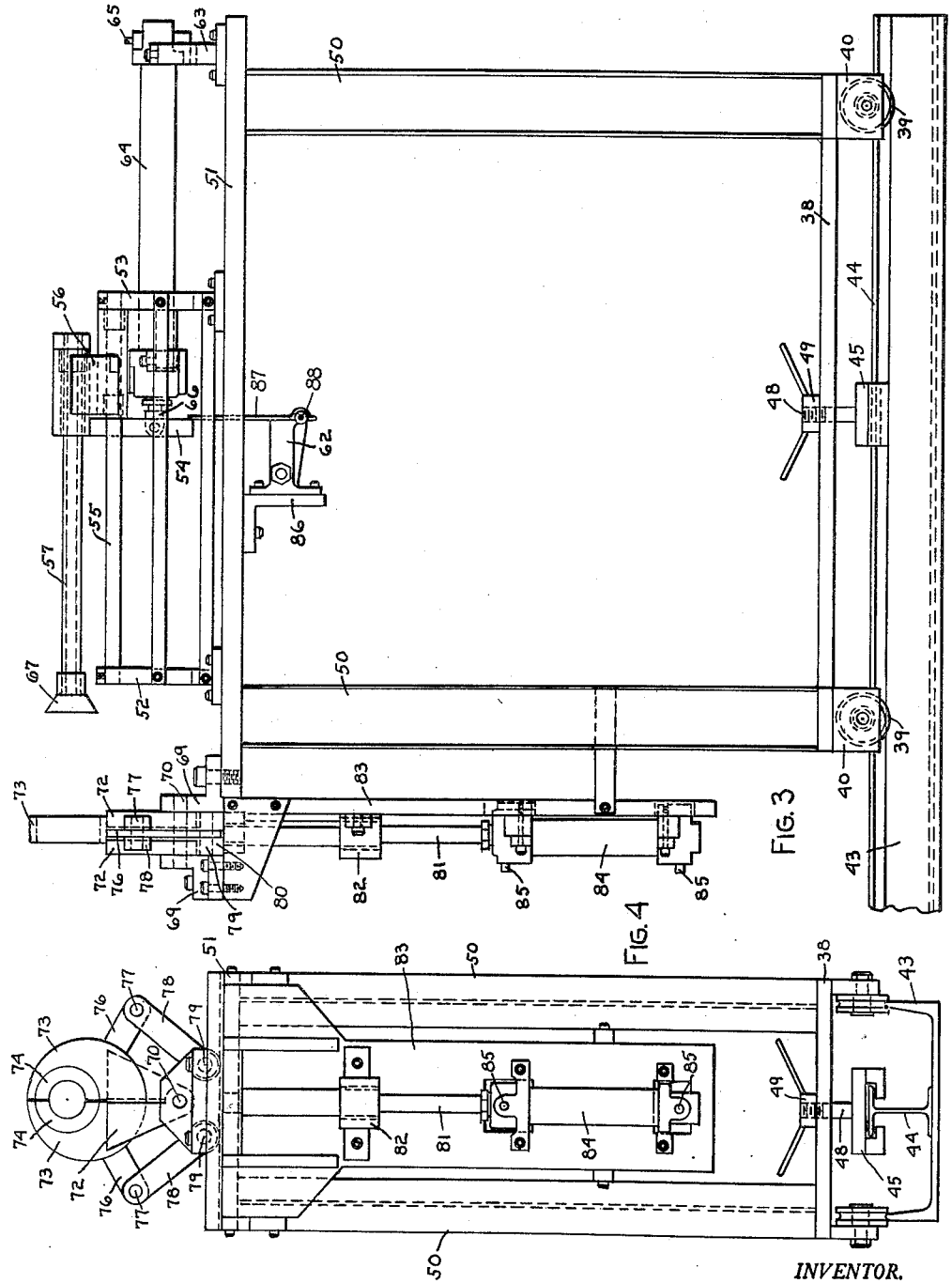

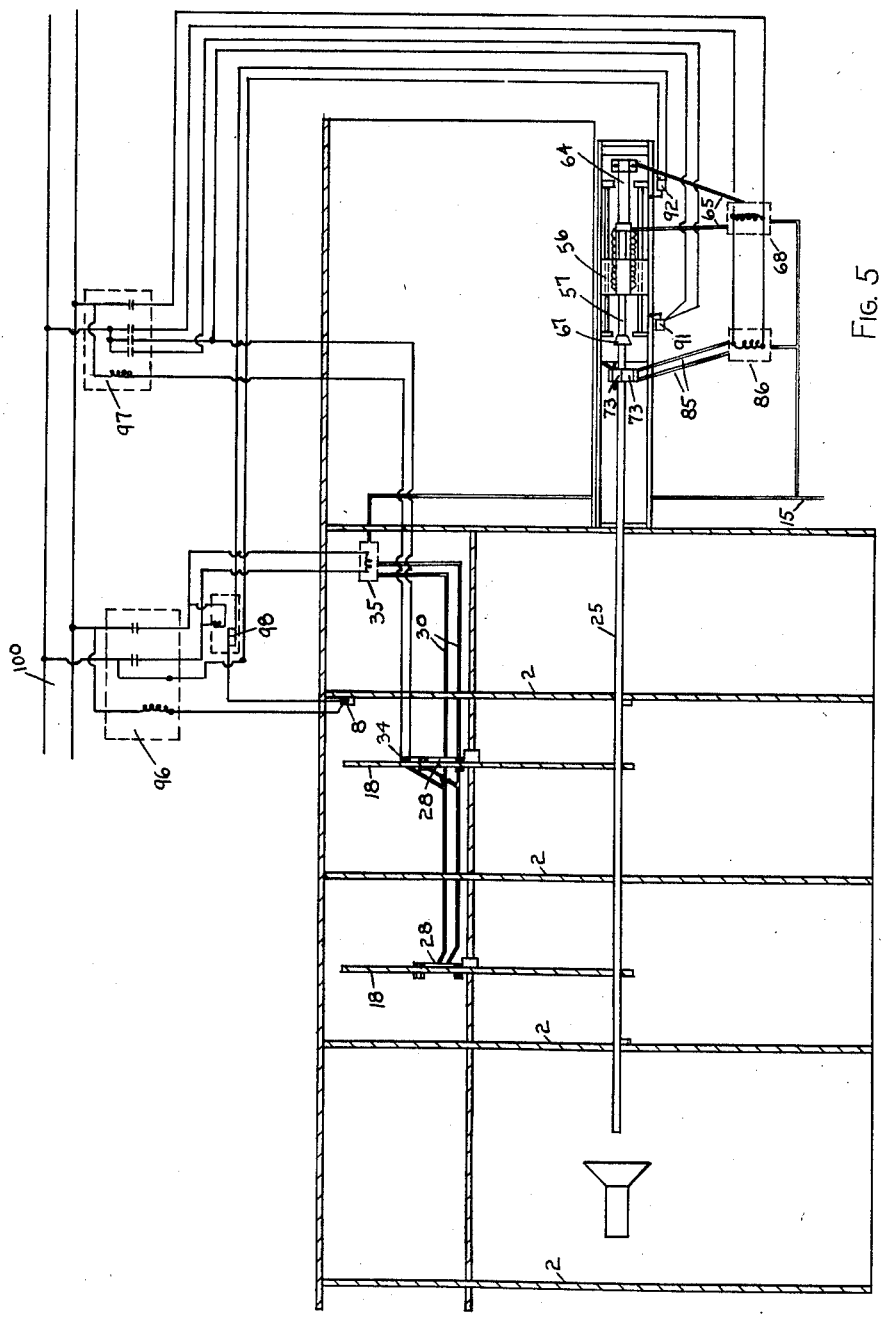

Patented Apr. 13, 1954

2,674,760

UNITED STATES PATENT OFFICE 2,674,760

TUBE CLEANING APPARATUS

Harry J. Finch, Oil City, Pa., assignor to Jones & Laughlin Steel Corporation, Pittsburgh, Pa., a corporation of Pennsylvania Application April 9, 1952, Serial No. 281,291

4 Claims. (Cl. 15—304)

This invention refers to improved apparatus for cleaning the interior of pipes and tubes or similar elongated hollow articles and is more particularly concerned with automatic apparatus for cleaning the interior of successive pipes or tubes as they come from a tube mill.

In the manufacture of tubing by the cold forming and electric welding of thin metal strip, for example, cooling and lubricating fluid is supplied to the rolls which bend the strip into tubular shape before welding. Since the tube is welded with the seam uppermost, an appreciable amount of such fluid as well as particles of dirt and other foreign materials are trapped within the tube when it is welded. Likewise, if the burr of the weld inside the tube is trimmed off, as is often the case, the chips or shavings of this burr metal fall into the tubes. It is desirable to remove the above-mentioned fluid and solid particles from the tubes as they leave the mill since otherwise the fluid may drain inopportunely out of either end of the tube at some further stage in its processing or shipping. If the tube is allowed to stand with any considerable amount of moisture therein, it may rust along its interior surface. It is also desirable to remove solid particles of foreign material from the tube immediately, since if they are permitted to remain until further processing, they may interfere with such processing. Similar considerations apply in the manufacture of tubes by furnace welding or other methods.

It is an object of my invention, therefore, to provide an apparatus which directs a blast of air through each cut length of pipe or tube as it comes from the mill sufficient to remove therefrom all liquids and solid particles entrapped therein. It is a further object of my invention to provide such apparatus which will automatically clean each length of tubing as it comes from the mill without the necessity for manual control or in fact any supervision. Other objects will appear from the following description of my invention.

Electric weld tube mills commonly produce tubing in a continuous length which moves axially outward from the mill as it is welded and is cut into shorter lengths as desired by cutting mechanism at the mill and then caused to roll broadside onto an inspection table or rack. Other methods of tube manufacture produce tubes in lengths which are similarly discharged onto a rack. The apparatus of my invention is designed to operate at this point in the tube mill and to intercept each cut length of tubing as it is discharged from the mill, blow out the foreign matter entrapped in it, and pass it on for further handling or processing.

Reference is now made to the attached figures which illustrate an embodiment of my invention presently preferred by me.

Figure 1 is an isometric view of a rack or runout table adapted to be positioned adjacent a tube mill to receive cut lengths of tubing as discharged from such mill and feed them to my air blast apparatus.

Figure 2 is an isometric view of a portion of my apparatus including means for gripping each tube as it is held in proper position on the rack of Figure 1 and means for applying air blast to the end of such tube. The two portions of my apparatus illustrated in Figures 1 and 2 operate together as will be described. It will be noted that parts of Figures 1 and 2 are broken away so that otherwise concealed portions are visible.

Figure 3 is a side elevation of the apparatus of Figure 2, omitting certain details shown in Figure 2 for clarity.

Figure 4 is a front elevation of the apparatus of Figure 2.

Figure 5 is a schematic diagram of the controls for my apparatus.

Figure 1:
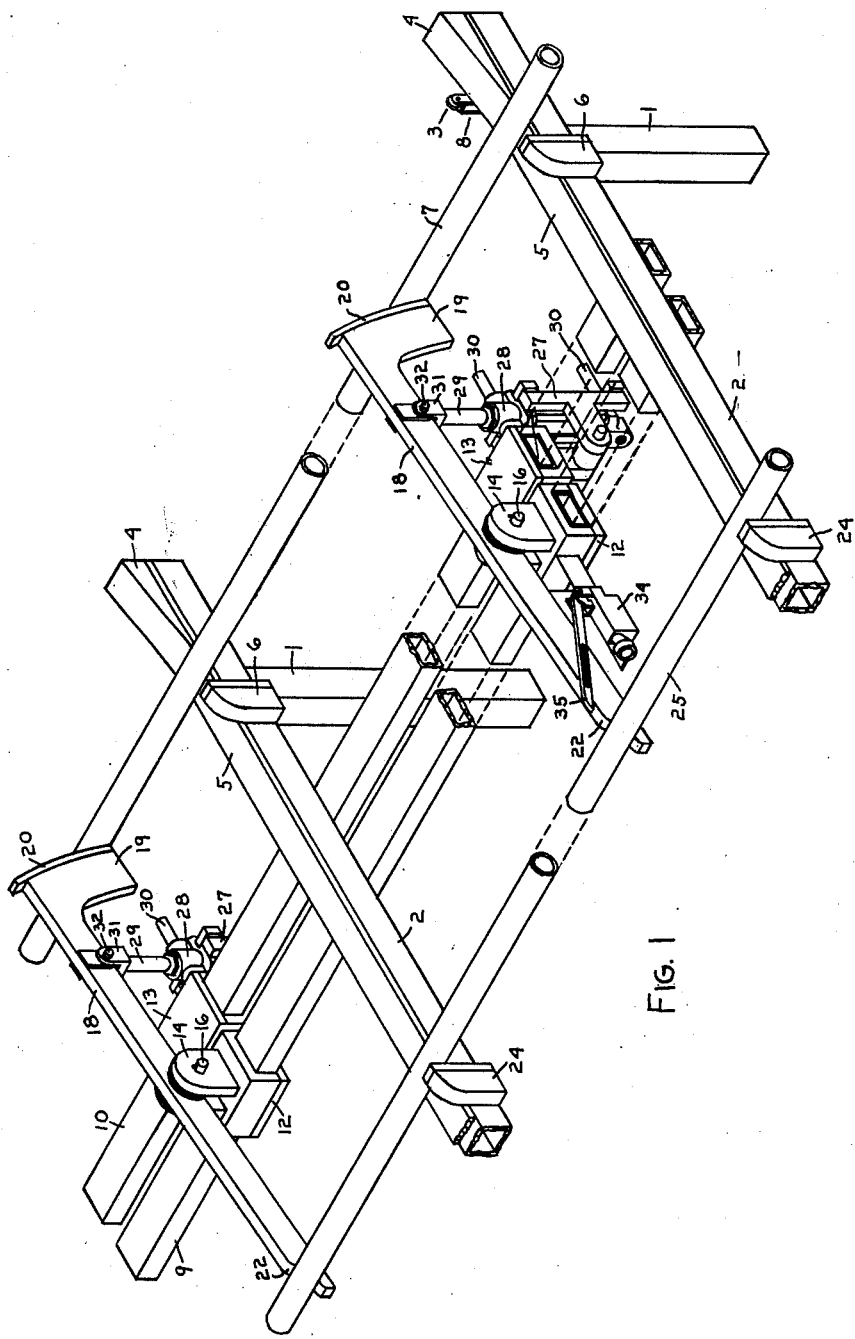

The rack shown in Figure 1 is provided with a plurality of legs 1—1 supporting cross members 2—2, the left hand ends of which as shown in Figure 1 are somewhat lower than the right hand ends so that gravity causes circular tubes to roll to the left. These horizontal members 2—2 are provided with inclined wedge-shaped members 4—4 at their ends adjacent the mill and may have their upper surfaces covered with strips 5—5 of wood, fiber, or other composition material. Horizontal members 2—2 are also provided with fixed stop members 6—6 against which tube 7 may rest. My rack is also provided with horizontal members 9 and 10 upon which are mounted movable collars 12—12 and 13—13. Adjacent collars 12 and 13 are connected together. Collars 12—12 are provided with upwardly projected brackets 14—14 journalling horizontal shafts 16—16. Kick-off arms 18—18 are pivoted on shafts 16—16 so as to be capable of rotation through an arc in a vertical plane. The ends of arms 18—18 adjoining the mill are elongated into arcuate sections 19—19, the outer surfaces of which may be covered with strips 20—20 of resilient material as desired. These end sections 19—19 when raised act as stops against which a tube may rest. The ends of arms 18—18 away from the mill are beveled at their upper surfaces 22—22. Horizontal members 2—2 are provided with a second set of fixed stops 24—24 against which a tube 25 rests when in position for cleaning. In this position tube 25 also rests upon the beveled ends 22—22 of the kick-off arms 18—18. Collars 13—13 each support by means of brackets 27—27 an air cylinder 28—28, the piston rod 29—29 of which terminates at its upper end in a clevis 31—31 pivotally connected to kick-off arms 18—18 by the pins 32—32. Collar 12 likewise supports an enclosed electric switch 34 which is operated by extended arm 35 so that as a tube 25, for example, rolls over horizontal members 2—2 it depresses arm 35 which in turn operates switch 34. Horizontal member 2 supports an enclosed electric switch 8 which is operated by extended arm 3 so that as tube 7, for example, rolls over horizontal members 2—2 it depresses arm 3 which in turn operates switch 8. Collars 12—12 and 13—13 are movable along members 9 and 10, respectively, so that the rack can accommodate tubes of different lengths.

Figure 2:
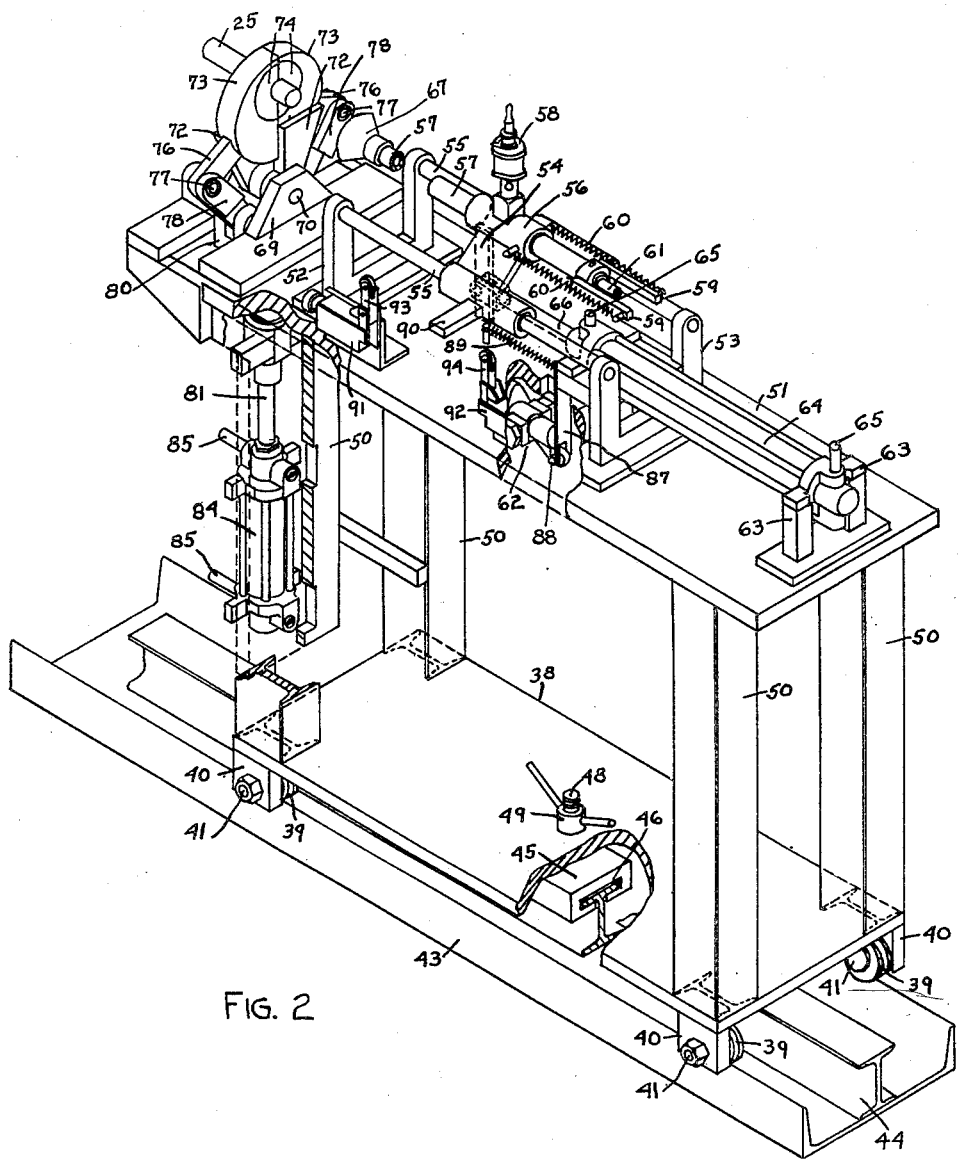

In Figures 2, 3, and 4 base plate 38 is mounted on rollers 39—39 by means of brackets 40—40 and stub shafts 41—41. Rollers 39 engage the upturned flanges of channel 43 which serves as a track. I-beam 44 is mounted along the inner face of channel 43 and block 45, which is provided with a T-shaped slot 46 fitting over the upper flange of channel 44, is attached to base plate 38 by threaded stud 48 and wing nut 49. Base plate 38 is provided with upright members 50—50 supporting bed plate 51 upon which are positioned U-shaped uprights 52 and 53. The arms of uprights 52 and 53 support horizontal rods 55—55 which are guides for crosshead 56. This crosshead 56 moves freely backward and forward along horizontal rods 55—55 and may be provided with brass bushings or other means to minimize friction with rods 55—55. Blower tube 57 is slideably mounted in crosshead 56 so that it also may move freely through this crosshead in the direction of the axis of tube 25. An oil cup 58 may be provided to lubricate blower tube 57. The axis of blower tube 57 coincides with that of tube 25. The rear end of blower tube 57 is provided with brackets 59—59 which are attached by tension springs 60—60 to crosshead 56. A flexible hose 61 (shown only in part) connects the rear end of blower tube 57 to air valve 62 mounted below bed plate 51. At the rear end of bed plate 51 a trunnion 63—63 supports the rear end of an air cylinder 64, the piston rod 66 of which is attached to vertical arm 54 affixed to crosshead 56. The front end of blower tube 57 terminates in a funnel-shaped member 67.

At the front end of bed plate 51 upright brackets 69—69 journal a shaft 70 about which pivot arms 72—72. Affixed to these arms are clamp jaws 73—73 provided with gripping inserts 74—74 of rubber or other frictional material. Clamp jaws 73—73 are also provided with outwardly extending lever arms 76—76 pivotally attached through pins 77—77 to toggle arms 78—78. These toggle arms 78—78 are in turn pivotally connected through pins 79—79 to yoke 80 which is attached to vertical rod 81 passing through sleeve 82. Sleeve 82 is affixed to front plate 83 which is supported by bed plate 51 and members 50—50. Rod 81 is connected to the piston of air cylinder 84 which is mounted upright on front plate 83 below bed plate 51.

Air valve 62 which has been previously mentioned is mounted below bed plate 51 on bracket 86. The flow of air through this valve is controlled by upright lever 87 pivoted on the valve body about the pin 88. The upper end of lever arm 87 is urged toward the front of the machine by tension spring 89. The upper end of lever arm 87 is made long enough so that it makes contact with vertical arm 54 of the crosshead when the latter is at the beginning of its stroke. Crosshead 56 is likewise provided with a horizontally projecting arm 90. A pair of enclosed electrical switches 91 and 92, provided with upwardly extended actuating arms 93 and 94, respectively, are positioned on bed plate 51 so that the extended arm 90 of crosshead 56 makes contact with arm 93 of switch 91 and depresses this arm at the end of the forward stroke of crosshead 56 and with arm 94 of switch 92 at the end of the return stroke.

The opposite ends of air cylinders 28—28 are supplied with air by a pair of air lines 30 which are connected through solenoid valve 35 to a source of compressed air 15. Air cylinder 84 is likewise supplied by a pair of air lines 85 which are connected through solenoid valve 86 to the source of compressed air. Air cylinder 64 in the same way is supplied by air lines 65 which lead through solenoid valve 68 to compressed air source 15.

A control circuit from electric power lines 100 passes through contactor 96, normally open electrical switch 8, a time delay relay 98, and normally open electrical switch 92. This control circuit operates three-way solenoid valve 35 which admits air to one or the other or neither of air lines 30. A second control circuit includes power lines 100, contactor 97, normally open electrical switch 34, and normally closed electrical switch 91. This circuit operates solenoid valves 68 and 86 which control air to air cylinders 64 and 84, respectively. The purpose of time delay relay 98 is to retard the action of contactor 96 in actuating solenoid valve 35 until crosshead 56 has been started forward by the control circuit operated by switch 34 and has opened switch 92. As long as switch 92 is open, kick-off arms 18—18 cannot be operated. This interlock prevents premature operation of these kick-off arms.

The operation of the apparatus of my invention as embodied in a commercial installation with which I am familiar will now be described. This installation is in conjunction with an electricweld tube mill producing tubing in a continuous length which is cut off into individual lengths as desired at the mill. These lengths roll broadside from the mill onto the rack illustrated in Figure 1. As the relative position of the ends of these tubes adjacent that portion of the apparatus shown in my Figure 2 is dependent on the length to which the tubing is cut at the mill and the speed of operation of the mill, it is first necessary to adjust my apparatus to accommodate tubes of the desired length. This may be done by moving base plate 38 and the apparatus carried thereby forward or backward along the track formed by channel 43. Wing nut 49 is loosened allowing block 45 to slide along I-beam 44 and the apparatus moved manually until it is properly located with respect to the rack of Figure 1. Wing nut 49 is then tightened on threaded stud 48, causing block 45 to be pulled up against the underside of the upper flange of channel 44 locking base plate 38 and associated apparatus firmly in position. It may also be desirable to adjust the positions of kicker arms 18—18 in accordance with the length to which the tubing is cut, and this is readily accomplished by sliding collars 12 and 13 backwards or forwards along members 9 and 10, respectively. To permit such movement the air connections to the various air cylinders of my apparatus are made with flexible hose.

It will be assumed to start with that crosshead 56 is in its extreme rearward position, that is to say, adjacent member 53. In this position vertical arm 54 engages lever arm 87 of air valve 62 shutting off the flow of air to blower tube 57. Kick-off arms 18 of the rack in Figure 1 are in the opposite position to that shown; that is, with their ends 19—19 depressed. Gripping jaws 73—73 are open. When a length of tube 7 is discharged from the mill, it falls on the inclined wedges 4—4 of the rack and rolls down these wedges over arm 3 of enclosed switch 8, depressing this arm and closing the circuit through this contact and solenoid valve 35 operating air cylinders 28—28. Air through this valve flows into the lower end of air cylinders 28—28 causing the pistons in the cylinders to be forced upward which causes kick-off arms 18—18 to pivot about pins 16—16 in a counterclockwise direction into the position shown in Figure 1. Ends 19—19 of these arms thus lift the tube they are carrying over stops 6—6 and allow it to roll down the arms 18—18 until it reaches the stops 24—24. This is the position in which the tube is held while air is blown through it.

Just before it reaches these stops, the tube 25 passes over and depresses the arm 35 of switch 34, closing the electrical circuit in this contact which actuates the solenoid air valve 86 admitting air to the upper end of air cylinder 84. Air pressure forces the piston downward and piston rod 81 moves yoke 80 downwardly, which, through toggle arms 76—76 and 78—78, causes pivoted jaws 73—73 to close around the end of the tube 25 as shown in Figure 2. The frictional elements 74—74 in jaws 73—73 grasp tube 25 firmly, securing it against both lateral and axial movement. The closing of switch 34 also operates solenoid valve 68 admitting air into the rear of air cylinder 64, thus causing crosshead 56 carrying blower tube 57 to move toward the clamped end of tube 25. As vertical arm 54 moves forward along with crosshead 56, pivoted lever arm 87 of air valve 62 is urged forward by tension spring 89, opening air valve 62 which permits air to flow into blower tube 57 through flexible air hose 61. Tension springs 60—60 initially position blower tube 57 so that funnel element 67 makes contact with the end of tube 25 before crosshead 56 reaches the forward end of its stroke. After this contact is made, blower tube 57 can move no farther and crosshead 56 continues its stroke by sliding over blower tube 57, which is held tight against the end of tube 25 by springs 60—60 pulling on arms 59—59.

When horizontally projecting arm 90 depresses arm 93 of switch 91, which occurs as crosshead 56 reaches the forward end of its stroke, it actuates switch 91 which in turn closes solenoid valve 68 supplying air to air cylinder 64 to cut off the flow of air to the rear of cylinder 64 and supply air to the front, thus reversing its stroke. This movement eventually disengages the blower tube 57 from tube 25. The operation of switch 91 also causes the solenoid valve 86 supplying air to air cylinder 84 to cut off air supply to the upper end of this air cylinder and supply air to the lower end, raising piston rod 81, and through the toggle arm linkage previously mentioned, opening gripping jaws 73—73, releasing tube 25. When horizontal arm 90 depresses arm 94 of switch 92, this contact actuates the solenoid valve supplying air to air cylinders 28—28 and allows air to enter the upper ends of said cylinders, causing kick-off arms 18—18 to rotate in a clockwise direction. The movement of beveled ends 22—22 of these kick-off arms lifts tube 25 over stops 24—24 and allows it to roll off the rack. At the same time, a new length of tubing from the mill is allowed to roll over the ends 19—19 of kick-off arms 18—18 and the entire cycle is repeated.

It will be noted that my apparatus operates entirely automatically as long as tubes are supplied to the rack from the mill, and ceases to operate when no more tubes are available. It requires attention only when the length to which the tubes are cut is changed or when the speed of the tube mill is changed, as this speed effects the position in which cut tubes are discharged upon my rack. Thus, it is not necessary that an operator be provided. The air blast directed through the tube effectively removes all loose solids and liquid therefrom leaving the interior clean and in condition to dry rapidly. The pressure of the air blown through a tube may, of course, be adjusted as desired by operating a valve in the line from the source of compressed air. No valve is shown in the figures as it is a well known device for controlling air pressure and flow. The length of time during which the air blast is on may be controlled by reducing or increasing the supply of air to air cylinder 64 which operates the crosshead 56. The more air supplied to this cylinder the faster it operates and the shorter the time the air blast is applied to the tube being cleaned. Again, this is accomplished by a conventional valve in the air line to this cylinder, not shown.

Although I have described a present preferred embodiment thereof, my invention is not to be considered as limited thereto but may be modified in detail as the requirements of the articles to be handled dictate.

I claim:

1. Apparatus for automatically cleaning the interior of tubes comprising a rack, means for positioning tubes for cleaning one at a time upon said rack, a track positioned adjacent an end of this rack and extending away from it in a direction parallel to the axes of the tubes, a carriage movably positioned upon the track, means for locking the carriage in position on the track, means mounted on the carriage for clamping the end of a tube against axial and lateral movement, a source of air under pressure, a valve therefor, a pipe connected to said source of air through said valve mounted upon the carriage for movement toward and away from the tube end, means for moving the pipe, and a nozzle for the pipe adapted to fit over the end of the tube when in contact therewith.

2. Apparatus for automatically cleaning the interior of tubes comprising an inclined rack, means for positioning tubes one at a time for cleaning upon said rack and for discharging cleaned tubes, means for clamping a tube so positioned against axial and lateral movement and releasing it, a source of air under pressure, a valve therefor, a pipe connected to said source through said valve reciprocally movable in the direction of the tube axis, a nozzle for said pipe adapted to fit over the end of the tube, means for moving said pipe toward the tube end and away therefrom, first control means triggered by the passage of a tube over the rack to actuate said positioning means, second control means triggered by passage of the tube over the rack to actuate said clamping means and said means for moving the pipe toward the tube end, third control means for said air valve actuated by movement of said pipe, fourth control means triggered by movement of said pipe toward the tube to actuate said means for moving said pipe away from the tube and to actuate said clamping means to release it, and fifth control means triggered by movement of said pipe away from the tube to actuate said positioning means to discharge the tube from the rack.

3. Apparatus for automatically cleaning the interior of tubes comprising means for holding a tube in feeding position, means for transferring a tube laterally from feeding to cleaning position, means for clamping a tube so positioned against axial and lateral movement, a source of air under pressure, a pipe movable in the direction of the tube axis connected to the source of air, a nozzle for the pipe adapted to fit over the end of a tube when in contact therewith, means for moving the pipe toward a tube end and away therefrom, first control means triggered by the arrival of a tube in feeding position to actuate the means for transferring a tube from feeding to cleaning position, and second control means interlocking with first control means to prevent the actuation of the means for transferring a tube from feeding to cleaning position when a tube is being cleaned.

4. Apparatus for automatically cleaning the interior of tubes comprising means for laterally positioning a succession of tubes one at a time for cleaning, means for clamping a tube so positioned against axial and lateral movement, a horizontal guide positioned parallel to the tube axis, a crosshead axially movable upon this guide, an air pipe aligned with the tube axially movable in the crosshead and attached thereto by resilient means, and means for moving the crosshead along the guide.

References Cited in the file of this patent

UNITED STATES PATENTS

| Number | Name | Date |
|---|---|---|
| 913,260 | Claflin | Feb. 23, 1909 |
| 1,014,333 | Saeger | Jan. 9, 1912 |
| 1,984,771 | Speller | Dec. 18, 1934 |
| 2,003,668 | Pittenger | June 4, 1935 |
| 2,210,531 | Engelbaugh et al. | Aug. 6, 1940 |
| 2,361,660 | Sneddon | Oct. 31, 1944 |
| 2,404,161 | Bower | July 16, 1946 |
| 2,426,095 | Hecker | Aug. 19, 1947 |
| 2,494,380 | Ellig | Jan. 10, 1950 |
| 2,606,846 | Pearson | Aug. 12, 1952 |